W. Clemson,
Saw Teeth.
N° 57,088. Patented Aug 14, 1866.
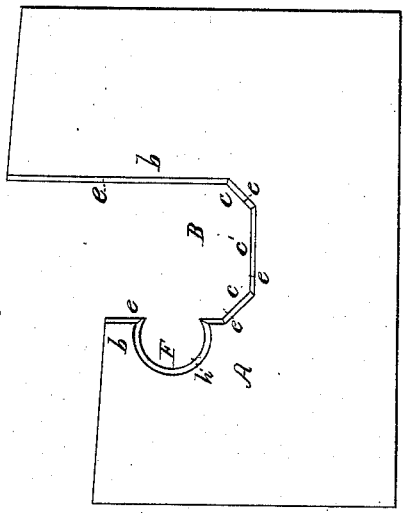
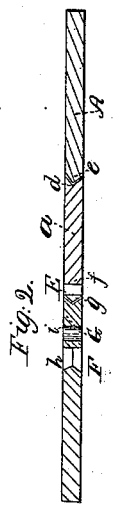
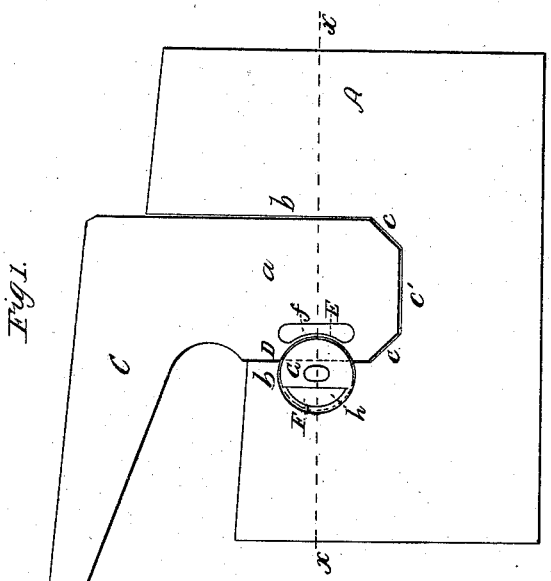
Witnesses:
Inventor:
Wm Clemson

UNITED STATES PATENT OFFICE.

WILLIAM CLEMSON, OF MIDDLETOWN, NEW YORK.

IMPROVEMENT IN SAWS.

Specification forming part of Letters Patent No. 57,088, dated August 14, 1866.

*To all whom it may concern:*

Be it known that I, WILLIAM CLEMSON, of Middletown, in the county of Orange and State of New York, have invented a new and Improved Mode of Securing Teeth in Circular Saws; and I do hereby declare that the following is a full, clear, and exact description thereof, which will enable others skilled in the art to make and use the same, reference being had to the accompanying drawings, forming part of this specification, in which—

Figure 1 is a side view of a portion of a circular saw having a tooth secured in it according to my invention; Fig. 2, a section of the same, taken in the line $x\ x$, Fig. 1; Fig. 3, a view of a portion of a saw with the tooth detached.

Similar letters of reference indicate like parts.

This invention relates to a new and improved mode of securing teeth in circular saws, as hereinafter fully shown and described, whereby it is believed that the following important results are obtained: first, the ready removal of the teeth from the saw-plate, as well as the ready attaching of them thereto; second, the preventing of the swelling or warping of the plate by the lateral pressure of the clamp which secures the teeth in the plate.

A represents a portion of the plate of a circular saw, and B a recess made in said portion of the plate to receive the shank or tang $a$ of the tooth C. This recess B is cut or formed radially in the plate from its edge inward, and has parallel or about parallel sides $b\ b'$, and an inner edge composed of three surfaces, $c\ c\ c'$, so as to avoid sharp angles, the angles formed by said surfaces being obtuse.

The tooth C may be of the usual or any proper form, and is provided with the shank or tang $a$, which corresponds in form to the recess B, and has grooves $d$ made in its sides and ends, to receive dovetail projections $e$ at the sides and end of the recess B, said grooves and projections preventing the shank from slipping laterally out of the recess. (See Fig. 2.)

In the shank or tang $a$ there is made an oblong slot, $f$, (shown clearly in Fig. 1,) and in the edge or side of the shank or tang opposite or adjoining the slot there is made a recess, D, which forms a portion of a circle, and has a projection, $g$, on its edge corresponding to the projection $e$ on the sides and end of the recess B.

The strip E, between the slot $f$ in the shank or tang and the recess D, forms a spring, the use of which will be presently shown.

In the plate A, at the side of the recess B, there is made a recess, F, which forms rather more than half a circle, and which, with the recess D, makes a complete circle, F being in line or coinciding with D, as shown clearly in Fig. 1, and having a projection, $h$, extending around its edge.

G is a clamp or plate, which forms a portion of a circle corresponding to the recess D, and of such dimensions that it may fit within D and turn therein, the periphery or edge of G having a groove extending all around its edge to receive the projection $h$ of F and the projection $g$ of D.

In order to secure the tooth in the saw-plate A, the plate or clamp G is turned around in the recess F, so as to coincide with it and not project at all within the recess B. This admits of the shank or tang $a$ being inserted within the recess B, and when this is accomplished the plate or clamp G is turned so as to fit within the recess D in the shank or tang, the turning of the plate or tang being effected by inserting a lever in a hole, $i$, made in it.

It will be seen from the above description that the plate or clamp G prevents the shank or tang $a$ from passing longitudinally out from the recess B, and the elastic strip or spring E prevents the saw-plate from warping or buckling under lateral pressure of the clamp, which is necessary in order to secure firmly the tooth in the saw-plate; and, besides this important result, the spring E prevents the clamp from working loose—a contingency which would otherwise be likely to occur in consequence of the rigidity of the metal surfaces in contact.

I would remark that the spring or elastic strip E, with slot $f$, may be advantageously used with rivets for securing the teeth in the saw-plate, and that one or more of said slots and elastic strips may be employed in connection with each tooth.

Having thus described my invention, I claim as new and desire to secure by Letters Patent—

1. The slots $f$, one or more, made in the shanks or tangs of the teeth, or in the saw-plate, or both, and having such a relative position with the rivets, clamps, or fastenings as to form springs or elastic strips E, to bear or bind against the rivets, clamps, or fastenings with an elastic or yielding pressure, substantially as described.

2. The plate or clamp G, fitted in the recess F in the saw-plate, in connection with the recess D in the shank or tang $a$, substantially as and for the purpose set forth.

WM. CLEMSON.

Witnesses:
  WM. F. McNAMARA,
  C. L. TOPLIFF.